United States Patent

Dieterich

[15] 3,690,038
[45] Sept. 12, 1972

[54] RECESSED WEATHER STRIP BODY

[72] Inventor: Melvin L. Dieterich, North Olmsted, Ohio

[73] Assignee: The Standard Products Co., Cleveland, Ohio

[22] Filed: Nov. 16, 1970

[21] Appl. No.: 89,657

[52] U.S. Cl. .............................................. 49/489
[51] Int. Cl. ........................................... E06b 7/16
[58] Field of Search ................................... 49/489

[56] References Cited

UNITED STATES PATENTS 3,396,712   8/1968   Sakraida et al. ......... 49/489 X
3,266,190   8/1966   Jackson ..................... 49/489

Primary Examiner—Kenneth Downey
Attorney—Meyer, Tilberry and Body

[57] ABSTRACT

A T-shaped weather strip adapted to fit into a T-shaped recess is made with a longitudinal cavity in the crossbar of the T. The free end of the upright of the T is provided with sealing means such as, for example, flocking which engages the surface of a cooperating closure element to form a seal against the passage of air which the weather strip is designed to prevent. The dimensions and structure are such that the strip can be squeezed transversely slightly to narrow the crossbar of the T sufficiently to enable lateral or longitudinal insertion of the strip into the slot.

3 Claims, 4 Drawing Figures

PATENTED SEP 12 1972  3,690,038

INVENTOR.
MELVIN L. DIETERICH
BY
Meyer, Tilberry & Body
ATTORNEYS.

RECESSED WEATHER STRIP BODY

CROSS REFERENCES TO RELATED APPLICATIONS

This application is related to the patent application of Aaron J. Ungerer, Ser. No. 89,582 filed Nov. 16, 1970 and assigned to the assignee of this invention.

BACKGROUND OF THE INVENTION

This invention relates to weather stripping, and especially to weather stripping which seals the space between two relatively movable closure elements, these elements usually being slidable relative to each other, the weather strip occupying a T-shaped recess in the surface of one of the closure elements and having a weather sealing material which extends through the slot forming the upright of the T and into engagement with the surface of the other closure element. The crossbar of the T should fit snugly into the corresponding portion of the recess so as to give a sealing action. However, it must not fit so tight that the strip cannot be slipped easily into place. In this respect problems have been experienced in the past because of variations, e.g., narrowing of the width of the crossbar portion of the recess due, for example, to wear of the extrusion die which forms the recess, and inaccuracies in the width of the crossbar of the sealing strip.

Also, replacement of an installed but worn out strip has presented problems because, in those circumstances, it is sometimes difficult or practically impossible to make an endwise insertion of the weather strip, so that it becomes desirable to replace the worn or damaged weather strip by direct access in a perpendicular direction relative to the surface in which the recess is provided to hold the weather strip. Weather strips made according to the prior art do not readily lend themselves to this type of treatment. Among the prior art which appears prima facie as though it might be pertinent is Fig. 5 of U.S. Pat. No. 3,266,190, issued Aug. 16, 1966 to Norman C. Jackson and assigned to the assignee of this invention. However, the Jackson patent suggests the use of polyethylene terephthalate, which is very expensive, and which tends to be too pliable in larger sizes to stay in the recess.

SUMMARY OF THE INVENTION

In accordance with the invention, a vinyl body, usually extruded, having a generally T-shaped cross section, is provided wherein the crossbar of the T has a continuous longitudinally extending cavity, and the free end of the upright of the T is provided with a sealing material. In the embodiment shown the sealing material is a dense flock forming a flared pattern on the free end of the T upright. The weather strip occupies a recess in one element of a two-element closure, the recess having a cross section which is also approximately a T shape, so that the crossbar of the weatherstrip occupies the crossbar space of the recess, and the upright of the weather strip T extends toward the surface of the closure element through the slot which is the upright of the T of the recess. The weather sealing material, here shown as the aforementioned flock, extends beyond the surface of the recess and into sealing engagement with the closely adjacent surface of the cooperating closure element which usually has a sliding engagement relative to the closure element in which the recess is provided. The cavity in the crossbar of the T is so dimensioned relative to the thickness and overall width of the crossbar and also relative to the slot in the recess that the sides of the crossbar of the weather strip may be displaced laterally toward one another to permit longitudinal sliding of the strip into the recess or insertion of the weather strip through the slot and into the recess in a direction generally perpendicular to the surface of the closure element in which the recess is provided.

It is accordingly an object of the invention to provide a weather strip which is resilient in a direction lateral or transverse to the crossbar to compensate for variations in the corresponding portion of the recess in which the strip must lie in an assembled closure on variations in the width of the crossbar of the strip.

It is also an object to provide a weather strip which can more easily replace damaged or worn weather strip in an installation already in place.

It is a further object of this invention to provide an improved weather strip which can be readily inserted in the recess of the surface of a closure member through the narrow slot leading to the recess from the front of the closure member in a direction substantially perpendicular to that surface.

These and other objects will be apparent to those skilled in the art from a study of the following description and the accompanying drawings.

The invention may take physical form in certain parts and arrangements of parts, a preferred embodiment thereof being described in detail in this specification and illustrated in the accompanying drawings which form a part hereof and wherein.

Figure 1:
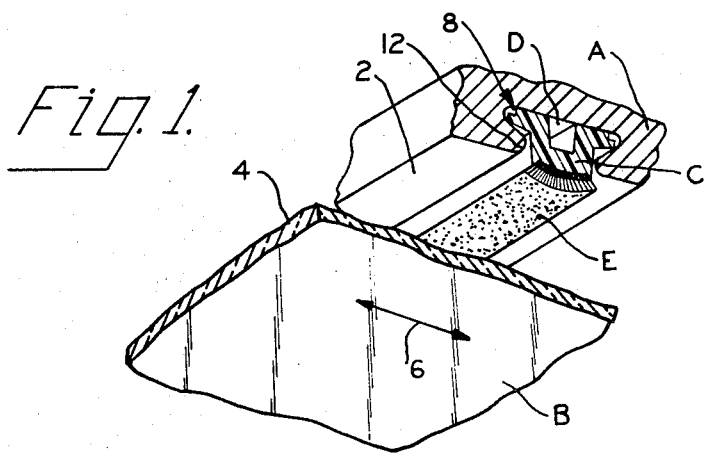
FIG. 1 is a view in perspective of a pair of cooperating closure elements provided with a weather strip made according to this invention.

Referring now to the drawings wherein the showings are for the purposes of illustrating a preferred embodiment of the invention only, and not for the purposes of limiting the same, the figures show a pair of cooperating relatively slidable closure elements A and B. Element A carries a weatherstrip C which resembles a T in cross section and which is provided with a cavity shown at D. The free end of the upright of the T is provided with a sealing material such as a flock E on said free end, the flock describing a flared pattern and being in sealing contact with the closure element B which is closely adjacent thereto.

More specifically, surface 2 of closure element A is closely adjacent to surface 4 of closure element B, these two elements usually having a sliding movement relative to each other. As one element slides relative to the other, usually in the direction of the double-headed arrow shown at 6, the tips of the flock E engage the surface 4 and serve to seal the space between surfaces 2 and 4 against the unwanted movement of air therebetween.

Figure 3:
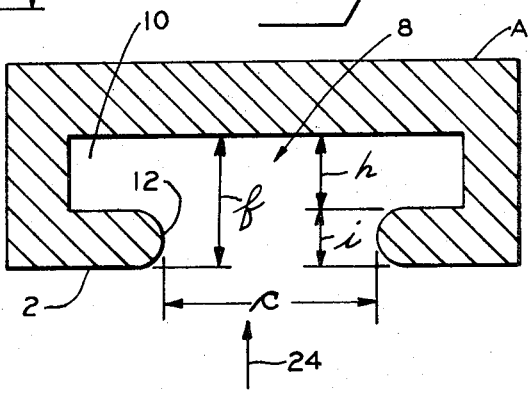
FIG. 3 is an enlarged view substantially on the scale of the view of FIG. 2, but showing the portion of the closure element in which the recess is provided which receives the weatherstrip body shown in FIG. 2.

The closure element A is recessed as shown at 8 in FIG. 1 and as shown in detail in FIG. 3, the recess having a generally T-shaped cross section in which the crossbar of the T is shown as an elongated space 10 and the upright of the T is shown as a slot 12 adjacent to surface 2.

Figure 2:
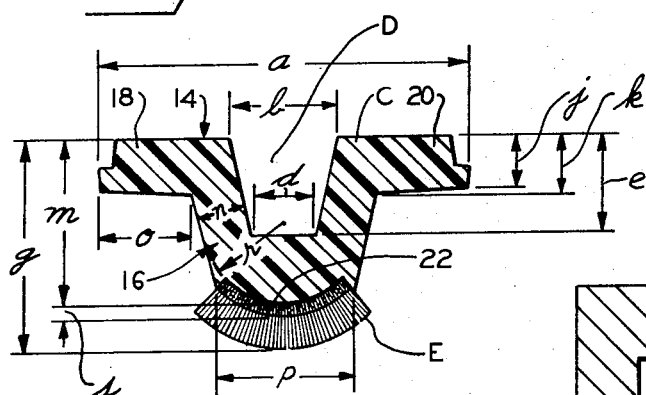
FIG. 2 is an enlarged view in cross section through the weather strip element itself apart from the recess it occupies in the assembled closure.

The weather strip C shown in the assembled closure in FIG. 1, is shown by itself in an enlarged view to bring out detail in FIG. 2. Reference should be had to the above-identified related application for certain details of the weather strip not discussed here and for a disclosure in detail of a method of making the weather strip C. For the purposes of this application, it will suffice to point out that the weather strip C consists of a plastic body, such as vinyl, which is preferably extruded, the plastic having a relatively high percentage of filler, such as calcium carbonate, in order to give the body hardness and stiffness and to lower the cost. The plastic body in cross section is generally in the form of a T having a crossbar shown generally at 14 and an upright generally at 16. Crossbar 14 has opposed side portions which serve as flanges 18 and 20, these flanges being adapted to fit in the opposite side portions of the wide opening identified at 10 if FIG. 3 and constituting the crossbar of the recess 8 in closure element A. Flanges 18 and 20 define overhanging edges which extend sideward from the upright 16 and are of a length defined by the dimension 0. The upright 16 of the T shown in FIG. 2 is adapted to extend between the sides of the slot 12 shown in FIG. 3 so that the flock E on the crowned end 22 of upright 16 can engage the surface 4 of closure element B. Midway of the crossbar 14 of element C, a cavity D is provided to enhance the natural resilience of the plastic of which the weather strip C is made, thus to move readily to permit lateral displacement of crossbar flanges 18 and 20 toward one another to achieve advantages more fully set forth hereinafter.

The recess 8 which the weather strip is adapted to occupy is in an element which is formed by an extrusion process, the recess itself being formed by a male die member which wears away due to erosion in use. It often happens that said die member has eroded or diminished in size quite considerably before an inspector notices the fact and requires replacement. However, by then a large quantity of the element has been produced having a recess which is substantially smaller in width than the recess which results when the die is new; and said large quantity is already in the channels of commerce. Thus there are closure elements having weather strip recesses which are theoretically the same size but which in fact vary quite a lot, so that a weather strip having a body size that is appropriate for an element extruded by a new male die might be extremely tight in an element extruded by a badly worn male die. It will be appreciated too that there may be variations in the width of the crossbar of the weather strip which result in a tight fit between the recess and weatherstrip even if the recess is produced by a new die.

It is, therefore, desirable that the weather strip body be of such a nature that it can be readily inserted into and have a desired fitting relationship with a rather wide variety of recess widths. The plastic of which the body of a weather-strip is made has some resilience, but the transverse resilience of the body is considerably enhanced by the continuous cavity D so that a plastic body with such a cavity is usable in a greater variety of recess sizes than the same plastic body not having the cavity.

In addition to the foregoing consideration of recesses varying in size, there is also the aspect of the replacement market. Weather strips made according to this invention wear long and well, but they are not indestructible and they can be worn out. In assembly of the recessed closures and the weather strips at the factory, it is customary to pull the strip into place longitudinally. However, when the strip is damaged or worn and needs to be replaced, the formerly open end of the recess may now be, and usually is, covered so as to be inaccessible, so that endwise insertion of a new weather strip becomes difficult or impossible. In strips made according to this invention, portions of the body are more readily transversely displaceable than a solid body because of the continuous cavity D, which is wide enough and deep enough to permit squeezing the flanges 18 and 20 of crossbar 14 together sufficiently to enable the introduction of the weather strip C into the recess 8 from the front of the surface 2. More specifically, the weather strip C can in this manner be placed in the recess in a direction generally perpendicular to the surface 2 as shown by arrow 24 in FIG. 3.

Figure 4:
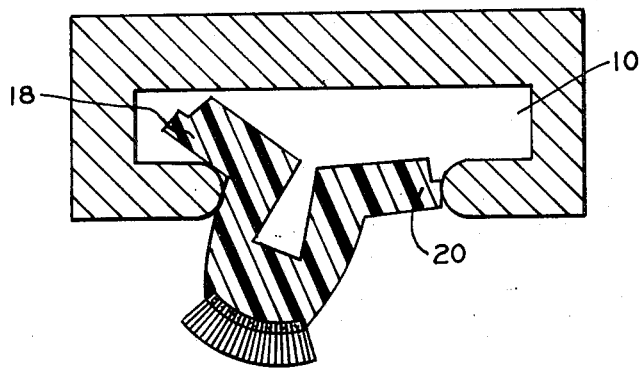
FIG. 4 is a view showing a weather strip according to this invention with the crossbar pinched to narrow its width as it is inserted into a cooperating recess.

FIG. 4 shows how a new strip embodying this invention can be inserted through the slot 12. It will of course be remembered that element C is an elongated strip, its length being perpendicular to the plane of FIGS. 2 and 4. If one side portion of the weather strip, for example flange 18, is placed through slot 12 into one side portion of the long space 10 of recess 8, as shown in FIG. 4, the other side portion of strip C including flange 20 can be laterally inwardly displaced, as shown in FIG. 4, enough to slip flange 20 of the crossbar through the slot 12 into the other side portion of space 10 of recess 8. The person doing the inserting works his way, a short length at a time, along the entire length of the strip being inserted.

The operation described above is made possible by the dimensions shown and by the resilience of the plastic body forming the element C, and toward that end, the free-state, or unrestrained, width of the crossbar less the free-state width of the cavity less the overhang of one end of the crossbar is preferably no greater than the width of slot 12. Expressed mathematically, $$a - b - o = c$$

It is further noted that, in strips of plastic having a high percentage of filler, the depth of cavity D (dimension $e$ in FIG. 2) is preferably greater than the thickness of the crossbar (dimension $k$ in FIG. 2), so that the strip may be more resilient in the direction of dimension $a$, FIG. 2.

It will, of course, be understood that there are different sizes of weather strips, but there is a degree of uniformity in such building materials, and examples of dimensions in which I have made strips and have found satisfactory are given hereinbelow;

$a = 0.187$ inch  $i = 0.040$ inch
$b = 0.050$ inch  $j = 0.025$ inch
$c = 0.125$ inch  $k = 0.030$ inch
$d = 0.040$ inch  $m = 0.080$ inch
$e = 0.050$ inch  $n = 0.030$ inch f = 0.085 inch
g = 0.140 inch
h = 0.045 inch
o = 0.041 inch
p = 0.100 inch
r = 0.050 inch
s = 0.010 inch Although the drawing and the specific dimensions b, d, and e set forth above to define a particular depth, width and configuration for cavity D, it is to be distinctly understood that a wide variety of cavity widths and depths as well as a wide variety of cross sectional configurations can be employed within the present invention.

The invention has been described with reference to the preferred embodiment. Obvious modifications and alterations will occur to others upon the reading and understanding of this specification. It is my intention to include all such modifications and alterations insofar as they come within the scope of the appended claims or the equivalence thereof.

What is claimed is:

1. In a weather strip for sealing the space between cooperable relatively movable closure members one of which includes a generally T-shaped recess and which weather strip includes an elongate body having a bridging portion, a first pair of legs extending from said bridging portion, and a second pair of legs each extending laterally from a corresponding one of said first pair of legs, said second pair of legs being receivable in the cross portion of said T-shaped recess and said bridging portion having an outer surface facing the other of said closure members, flocked fiber sealing material on said outer surface and projecting therefrom toward said other closure member, said outer surface being spaced a first distance from said other closure member and said flocked fiber having a free length greater than said first distance whereby said flocked fibers sealingly engage said other closure member, the improvement comprising:

said body being a rigid, vinyl plastic, said first pair of legs extending from said bridging portion in diverging relationship relative to one another for said bridging portion and first pair of legs to define a recess in said body having an inner end, an open outer end and diverging sidewalls extending from said inner toward said outer end, said bridging portion and said first and second pairs of legs being generally uniform in transverse cross-sectional thickness, said thickness being approximately one-sixth the lateral width between the lateral outer edges of said second pair of legs, said open outer end of said recess having a lateral width less than one-third said lateral width between the lateral outer edges of said second pair of legs, said recess having a depth greater than said thickness, and said bridging portion having a width less than two-thirds said lateral width between the lateral outer edges of said second pair of legs, the dimensional relationship between said bridging portions, pairs of legs and recess together with the diverging relationship of said first pair of legs and the width of the open outer end of said recess providing for said pairs of legs to be displaced laterally inwardly relative to one another free of compressive interengagement between the sidewalls of said recess for introducing said second pair of legs into said T-shaped recess, and said thickness of said bridging portion and pairs of legs together with the width of the bridging portion, the diverging relationship of said first pair of legs and the rigidity of said vinyl plastic providing for said bridging portion to resist deflection inwardly of said T-shaped recess and for said first pair of legs to maintain said outer surface of said bridging portion in said spaced relationship with respect to said other closure member upon sealing engagement between said flocked fiber and other closure member.

2. The weather strip according to claim 1, wherein said width of said cavity is greater than said thickness of said bridging portion and said first and second pairs of legs.

3. The weather strip according to claim 1, wherein the free state width of the body between the lateral outer edges of said second pair of legs, less the free-state width of said open outer end of said recess, less the lateral dimension between the lateral outer edge of one of said second pair of legs and the outer side of the corresponding one of said first pair of legs is no more than the width of the opening of said T-shaped recess.

* * * * *